United States Patent [19]

Carson et al.

[11] Patent Number: 4,945,468
[45] Date of Patent: Jul. 31, 1990

[54] TRUSTED PATH MECHANISM FOR VIRTUAL TERMINAL ENVIRONMENTS

[75] Inventors: Mark E. Carson, Rockville; Abhai Johri, Gaithersburg, both of Md.

[73] Assignee: International Business Machines Corporation, Armonk, N.Y.

[21] Appl. No.: 150,965

[22] Filed: Feb. 1, 1988

[51] Int. Cl.$^5$ .......................... H04L 9/00; H04K 1/00; G06F 12/14; G06F 9/44
[52] U.S. Cl. ................................ 364/200; 364/286.5; 364/228.4; 364/918.7
[58] Field of Search ... 364/200 MS File, 900 MS File; 380/25

[56] References Cited

U.S. PATENT DOCUMENTS

| | | | |
|---|---|---|---|
| 4,183,085 | 1/1980 | Roberts et al. | 364/200 |
| 4,218,738 | 8/1980 | Matyas et al. | 364/200 |
| 4,253,145 | 2/1981 | Goldberg | 364/200 |
| 4,328,542 | 5/1982 | Anastas et al. | 364/200 |
| 4,442,484 | 4/1984 | Childs, Jr. et al. | 364/200 |
| 4,488,217 | 12/1984 | Binder et al. | 364/200 |
| 4,593,353 | 6/1986 | Pickholtz | 364/200 |
| 4,885,789 | 12/1989 | Burger et al. | 380/25 |

OTHER PUBLICATIONS

T. A. Berson, et al., "KSOS-Development Methodology for a Secure Operating System," Proc. of the Natl. Comp. Conf., vol. 48, AFIPS Press, 1979, Montvale, N.J., pp. 365–372.
S. Kramer, "LINUS IV-An Experiment in Computer Security,"Proc. of the 1984 Symposium on Security and Privacy, Oakland, Calif., Apr. 1984, pp. 24–33.
G. J. Popek, et al., "UCLA Secure Unix," Proc. of the Natl. Comp. Conf., vol. 48, AFIPS Press, 1979, Montvale, N.J., pp. 355–364.

Primary Examiner—Gareth D. Shaw
Assistant Examiner—Gopal C. Ray
Attorney, Agent, or Firm—John E. Hoel

[57] ABSTRACT

When the user is logged on to a processor running multiple virtual terminals and he presses the Secure Attention Key, the existing virtual terminal processes are not destroyed. Instead, the invention creates a new virtual terminal, establishes a trusted path for the new virtual terminal, makes the new virtual terminal the current virtual terminal, and then runs the trusted process in the new virtual terminal.

14 Claims, 7 Drawing Sheets

FIG. 6.

TRUSTED PATH MECHANISM FOR VIRTUAL TERMINAL ENVIRONMENTS

BACKGROUND OF THE INVENTION

1. Technical Field

The invention disclosed broadly relates to data processing and more particularly relates to the establishment of a trusted path between in systems with virtual terminal features.

2. Background Art

Many data processing applications involve highly confidential information such as in financial applications, national security applications, and the like where information enters the data processing system by means of a user typing that information at a user terminal connected to the system. The prior art has not provided an effective mechanism to prevent unauthorized persons or programs from reading data from a user terminal. In prior art data processing systems, the communication path between the local processor and the operating system software can either be forged or penetrated by an unauthorized program known as a Trojan horse, which can masquerade as the program with which the user intends to communicate, and can divert, replicate or otherwise subvert the security of the confidential information being input by the user at his terminal.

For national security/applications, the United States Government has established a standard by which the security of data processing systems can be evaluated, that standard having been published in "Trusted Computer System Evaluation Criteria," U.S. Department of Defense, December 1985, DoD publication number 5200.28-STD (referred to herein as DoD Standard). The DoD Standard defines a trusted computer system as a system that employs sufficient hardware and software integrity measures to allow its use for processing simultaneously a range of sensitive or classified information. A trusted computing base (TCB) is defined as the totality of protection mechanisms within a computer system, including hardware, firmware and software, the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters such as a user's clearance, related to the security policy. A trusted path is defined by the DoD Standard as a mechanism by which a person at a terminal of a local processor can communicate directly with the trusted computing base. The trusted path mechanism can only be activated by the person or the trusted computing base and cannot be imitated by untrusted software. Trusted software is defined as the software portion of a trusted computing base.

The problem of maintaining a trusted path between a local processor and a trusted computing base in a remote processor is compounded for those operating systems which accommodate multiple users. Some examples of prior art multi-user operating systems which have not provided an effective mechanism for establishing a trusted path include UNIX (UNIX is a trademark of AT&T Bell Laboratories), XENIX (XENIX is a trademark of Microsoft Corporation) and AIX (AIX is a trademark of the IBM Corporation). UNIX was developed and is licensed by AT&T as an operating system for a wide range of minicomputers and microcomputers. For more information on the UNIX Operating System, the reader is referred to "UNIX (TM) System, Users Manual, System V," published by Western Electric Company, January 1983. A good overview of the UNIX Operating System is provided by Brian W. Kernighan and Rob Pike in their book entitled "The UNIX Programming Environment," published by Prentice-Hall (1984). A more detailed description of the design of the UNIX Operating System is to be found in a book by Maurice J. Bach, "Design of the UNIX Operating System," published by Prentice-Hall (1986).

AT&T Bell Labs has licensed a number of parties to the use of UNIX Operating System, and there are now several versions available. The most current version from AT&T is Version 5.2. Another version known as the Berkley version of the UNIX Operating System was developed by the University of California at Berkley. Microsoft Corporation has a version known under their trademark as XENIX.

With the announcement of the IBM RT PC (RT PC are trademarks of IBM Corporation), (RISC (reduced instruction set computer) technology personal computer) in 1985, IBM Corporation released a new operating system called AIX which is compatible at the application interface level with AT&T's UNIX Operating System, Version 5.2, and includes extensions to the UNIX Operating System, Version 5.2. For a further description of the AIX Operating System, the reader is referred to "AIX Operating System Technical Reference," published by IBM Corporation, 2nd Edition (September 1986).

Copending U.S. Patent Application, Ser. No. 149,446, filed Jan. 28, 1989 (now a U.S. Pat. No. 4,918,653), by Abhai Johri and Gary Luckenbaugh entitled "A Trusted Path Mechanism for An Operating System," assigned to the IBM Corporation, is incorporated herein by reference. The Johri and Luckenbaugh application discloses a trusted path mechanism invention which guarantees that data typed by a user on a terminal keyboard is protected from any intrusion by unauthorized programs. It allows a user to create a non-forgeable and non-penetrable communication path between the user's terminal and the trusted operating system software. The user can create a trusted path by simply pressing a key, called the Secure Attention Key (SAK), on the terminal keyboard. This operation can be called when the user logs into the system in order to be sure that the user is communicating with the real login program and not a Trojan horse program masquerading as a login program, which would steal the user's password. After the user has established the trusted path, he can enter his critical data, such as a password, and can be sure that his password is not being stolen by an intruder's program. Then, after the user logs out, he can be sure that the trusted path has actually logged him out of the system so that a Trojan horse program is not capable of continuing the session started by the user.

The invention described in the Johri and Luckenbaugh application, is contained in a data processing system including a memory to which is connected a plurality of terminals, with at least one terminal including a keyboard having a Secure Attention Key. It is a method in a UNIX-type operating system for creating, in response to the Secure Attention Key, a trusted path between the terminal and a trusted shell portion of a trusted computing base which is a child process of an init process under the operating system. The method includes detecting the Secure Attention Key in a keyboard device driver connected to the keyboard and outputting from the keyboard device driver to a Secure Attention Key Signal Generator, information that the Secure Attention Key has been been detected. It further includes outputting from the Secure Attention Key Generator a SIGSAK signal to all processes operating in a process group of the terminal, terminating all of the processes in the terminal process group. The method further includes applying the SIGSAK signal to access authorization tables associated with all the device drivers interfacing with the terminal, to deny access authorization to all processes in the data processing system except the init process. The method further includes applying the SIGSAK signal to a file access table to remove all addressing information relating the device drivers interfacing with the terminal, to all processes in the data processing system except the init process. The method further includes executing a fork system call by the init process for a new child process. The method further includes executing an exec system call to overlay a trusted shell process onto the new child process, the trusted shell process having access authorization to the device drivers interfacing with the terminal and the trusted shell process having an addressing relationship defined in the file access table to the device drivers interfacing with the terminal. Thereby a trusted path is established between the terminal and the trusted shell process.

However, the trusted path approach of Johri and Luckenbaugh creates some problems when applied in a data processor which is running multiple windows or virtual terminals, since establishing the trusted path in one of the virtual terminals can destroy the concurrent sessions running in the other virtual terminals on the same processor.

Copending U.S. Patent Application, Ser. No. 820,451, filed Jan. 17, 1986 by D.C. Baker, et al, entitled "A Virtual Terminal Subsystem", assigned to IBM Corporation, is incorporated herein by reference, for its explanation of virtual terminals. Baker et al disclose a method of, and apparatus for, running several applications concurrently on a processing system. Virtual terminals are created for running the applications. However, the virtual terminals perform as though the processing system were a single terminal system. In this way, any application written for a single terminal system can run in this multiple virtual terminal environment. For interaction with one of the several applications running on this system, the real physical resources of the system are reallocated to the virtual terminal running the selected application.

Copending U.S. Patent Application, Ser. No. 820,453, filed Jan. 17, 1986 by F. H. Fatahalian, et al, entitled "Virtual Terminal Monitored Mode", assigned to IBM Corporation, is incorporated herein by reference, for its further explanation of virtual terminals. Fatahalian, et al disclose a data processing system which gives an application running on the operating system direct access to the output display. The system is operable in two modes. In the first mode, if the application displays text to the output display, the output data must go through every layer of the processing system before it reaches the output display. In the second mode, the application can output data directly to the output display without going through the many layers of the processing system. In this second mode, a buffer is defined by the application. Input data from the input devices are stored in this buffer. The application accesses the buffer for direct output to the display.

The invention disclosed and claimed herein specifically concerns providing a mechanism for establishing a trusted path in a data processor running several virtual terminals in a multi-user operating system such as UNIX, XENIX, or AIX, so that unauthorized programs are prevented from reading data in one of the virtual terminals. None of the prior art multi-user operating systems provides a mechanism for establishing a trusted path which is effective in preventing unauthorized programs from reading data from a virtual terminal.

OBJECTS OF THE INVENTION

It is therefore an object of the invention to provide a mechanism for establishing a trusted path in a virtual terminal.

It is still a further object of the invention to provide a mechanism for establishing a trusted path for a multi-user operation system running virtual terminals.

It is still a further object of the invention to provide a trusted path mechanism for a UNIX (TM)-type operating system running virtual terminals.

SUMMARY OF THE INVENTION

These and other objects, features and advantages of the invention are accomplished by the trusted path mechanism for virtual terminals disclosed herein. When the user is logged on to a processor running multiple virtual terminals and he presses the Secure Attention Key, the existing virtual terminal processes are not destroyed. Instead, the invention creates a new virtual terminal, establishes a trusted path for the new virtual terminal, makes the new virtual terminal the current virtual terminal, and then runs the trusted process in the new virtual terminal.

DESCRIPTION OF THE FIGURES

These and other objects, features and advantages of the invention will be more fully appreciated with reference to the accompanying figures.

DESCRIPTION OF THE PREFERRED EMBODIMENT

FIGS. 1 through 7 provide a generalized description of the trusted path mechanism for virtual terminal environments. FIG. 1 through 6 show various states of a data processor which includes a microprocessor connected to a memory into which is loaded a UNIX-like operating system from a disk drive, along with a sequence of user application programs. A terminal which includes a display monitor and a keyboard are also connected to the memory, enabling the user to interact with programs running on the data processor. The data processor can be the IBM RT PC previously referred to, running the AIX operating system, which includes virtual terminal support features as described in the above referenced E. C. Baker, et al and H. F. Fatahalin, et al copending patent applications.

The primary UNIX-type operating system file is the kernel which is loaded into the memory from the disk drive and which is considered a part of the trusted computing base. The kernel carries out initialization operations, organizing the system and opening requisite files necessary to carry on multi-user and virtual terminal operations. After the kernel completes the basic process of initialization, it starts the init process which is the ancestor of all other processes in the system. The term process, as used herein, is a sequence of actions, such as a user program or subroutine, which is required to produce a desired result. Execution of processes can be begun by entering a command, running a shell program or by being started by another process. The init process controls the state in which the system is running and is also a part of the trusted computing base. Included in the init process are trusted path functions which can create a trusted path in response to the user pressing a Secure Attention Key on the keyboard, in accordance with the invention. Background information on trusted path operations for systems not supporting virtual terminal operations can be found in the copending patent application by Johri, et al, referred to above. Virtual terminal manager functions can also be included as a part of the init process, or alternately could be a part of the kernel process.

Figure 1:
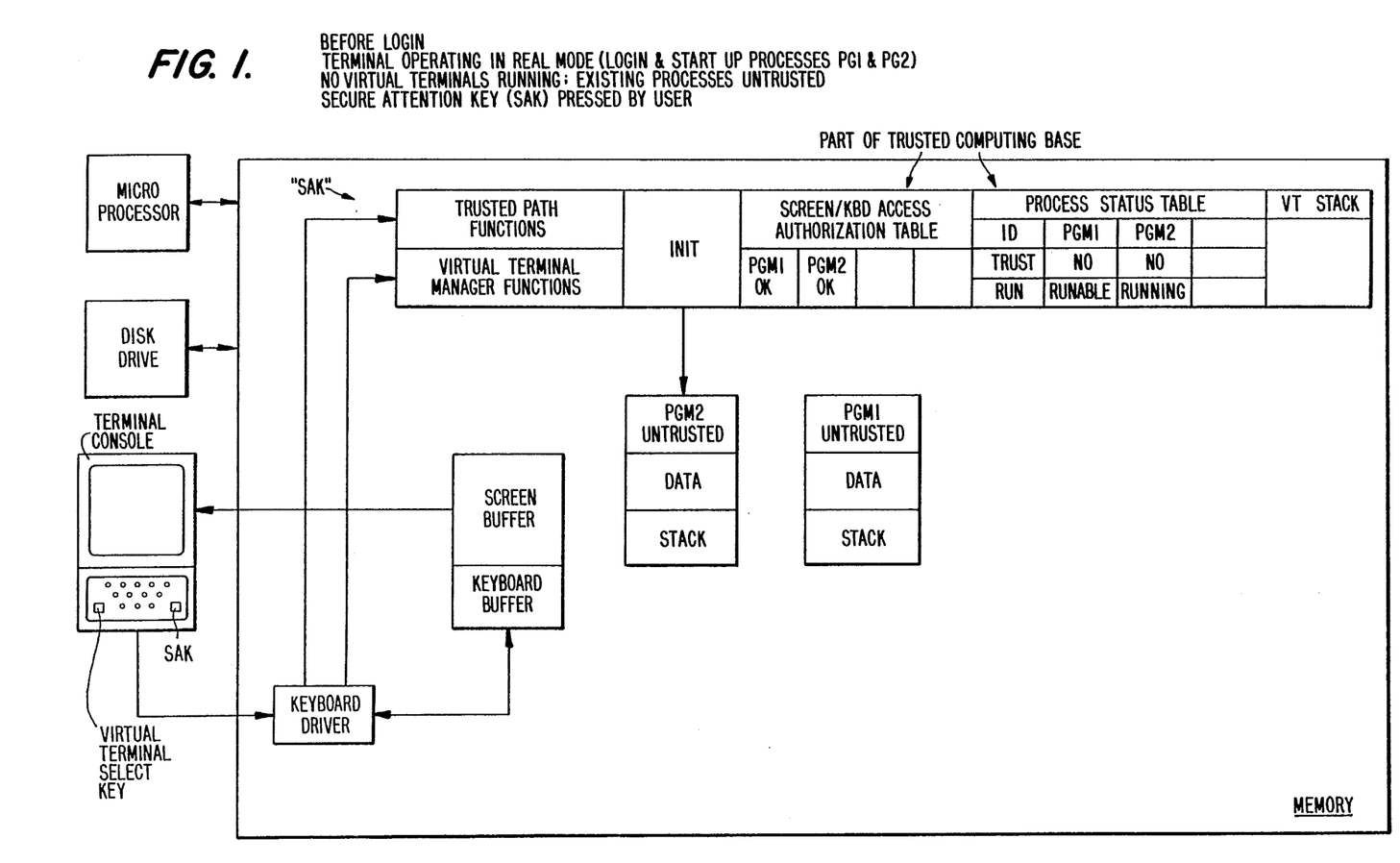
FIG. 1 is a schematic diagram of a data processor in its state before login, when the Secure Attention Key is pressed by the user.

As is seen in FIG. 1, the terminal console has its display connected to a screen buffer which is a part of the memory and stores alphanumeric or all points addressable data which is to be currently displayed on the display screen. The phrase "terminal console " as used herein refers to a computer data terminal, and is used interchangeably with the word "terminal". Processes running in a data processor can interact with the screen buffer to modify the image being displayed on the display screen, if they are authorized to access the screen buffer by an appropriate entry in the screen/keyboard access authorization table. The keyboard of the terminal is connected to the keyboard driver which processes the characters output from the keyboard. Alphanumeric and some control characters are passed from the keyboard driver to the keyboard buffer. A keyboard image can be stored in the keyboard buffer which can be output back to the keyboard driver for controlling the meaning of various keys and key combinations on the keyboard. A special Secure Attention Key (SAK) on the keyboard is intercepted by the keyboard driver and is passed to the trusted path functions in the init process, to initiate the establishment of a trusted path. A virtual terminal select key on the keyboard is intercepted by the keyboard driver and passed to the virtual terminal manager functions in the init process to enable the user to selectively interact with his choice of one of the virtual terminals which he has opened on the data processor.

UNIX-type processes which run in the UNIX-like environment consist of three basic portions, a program text portion, a data portion and a stack portion, as depicted for the processes PGM1 and PGM2 in FIG. 1. The process status table, which is a part of the trusted computing base and can either be a part of init, a part of the kernel, or can be a separate partition in the memory, maintains an up-to-date record of the state of each respective process resident in memory along with the user id, its status of being a trusted or untruseed process, and its current running status. In UNIX-like operating systems, the system call "fork" creates two newly identical copies of a process. When a process is established, init will copy itself as the parent process and will spawn a child process. All parts of the image of the parent process are inherited by the child, including open files. The child process has its own data and stack portions. The only resources shared by a parent and a child are files that were opened when the parent underwent the "fork" system call. The child process then performs an overlay operation upon itself of the image of the next process which is to be established. The overlay operation is accomplished by another UNIX-like system call, the "Exec" system call. The exec system call overlays the child process that is running, with a new program and begins execution of the new program at its entry point. The process id of the new program is unchanged by the exec system call. If successful, the exec system call does not return and the calling program image is lost. In this manner, UNIX-like operating systems create a new process. The running state of that new process can be any one of five or more states. In a multi-programming mode of operation, a process may be either running or runable, depending upon whether it is either currently being executed or is waiting to be switched in from a temporary waiting state in order to be executed. The process can also be stopped in a stopped state, where it remains resident, but is not executed until affirmatively restarted. Some processes wait for events to occur before being executed, this state being called the "sleeping" state. Finally, those processes which have been terminated but not yet removed from residence in the memory, are referred to as "zombie" processes. These various running states are kept track in the process status table shown in the data processor of FIG. 1.

FIG. 1 depicts the state of the data processor before the user has logged in. The data processors terminal is operating in the real mode in this state where the login process PG1 and the startup process PG2 provide the user with an untrusted login operation. The security problem presented to the user is that he cannot be sure if he can login and have his user password validated without having his password or other secure information diverted, replicated or otherwise subverted by an unauthorized person or program. In order to establish a trusted path to a trusted login process, the user presses the Secure Attention Key (SAK) on the keyboard in FIG. 1 and FIG. 7.

Figure 2:
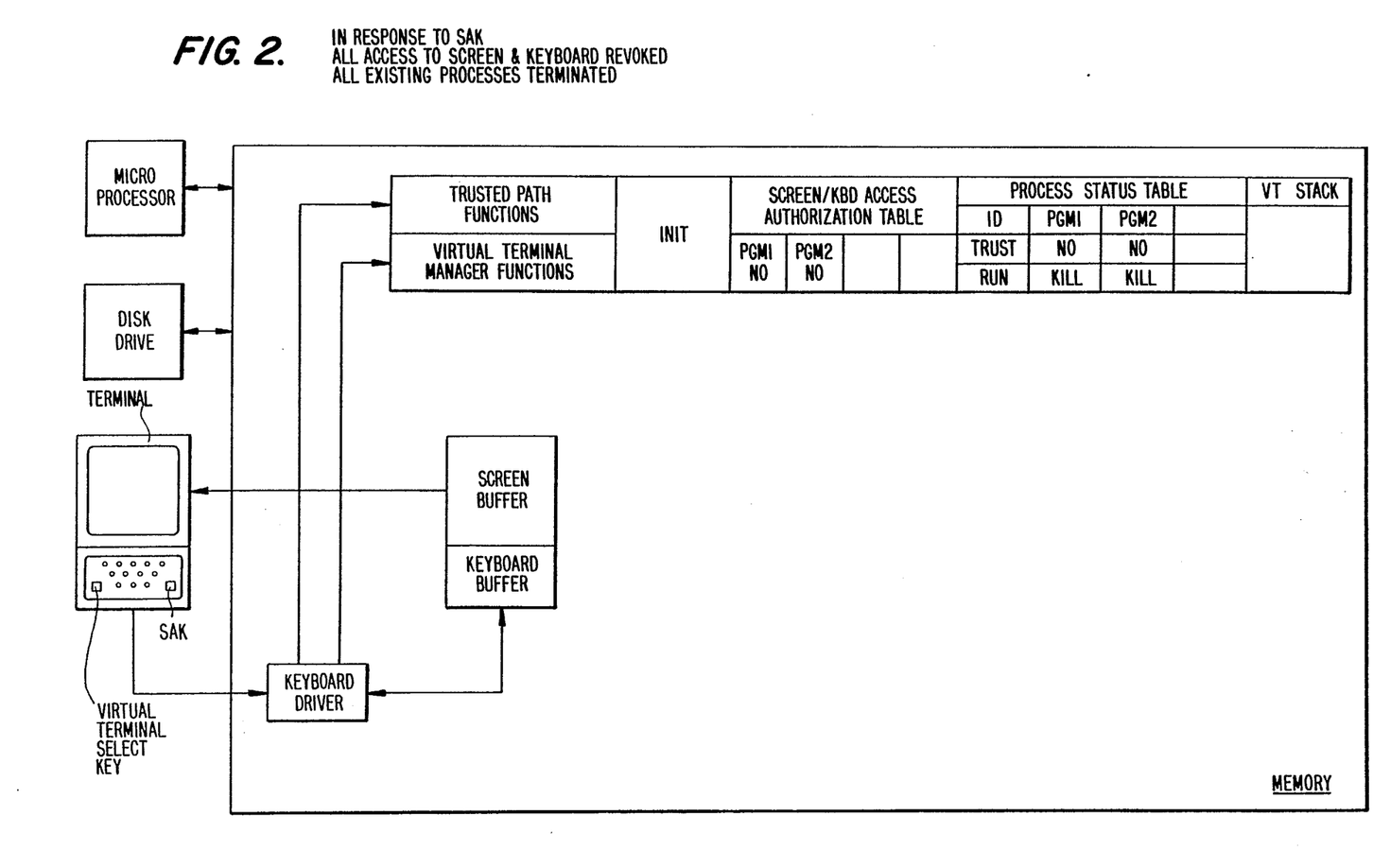
FIG. 2 shows the data processor in a state following that FIG. 1, wherein response to the Secure Attention Key, all access to the screen and keyboard is revoked and all existing processes are terminated.

In FIG. 2, in response to the user pressing the SAK, the SAK information is intercepted by the keyboard driver and is passed to the trusted path functions in the init process. In response, the init process revokes all access by existing processes to the screen buffer and the keyboard buffer, as can be seen by the change in the entries in the screen/keyboard access authorization table. In addition, the init process terminates all existing processes in the terminal process group, thereby assuring that any unauthorized Trojan horse programs resident in memory will be removed. See FIG. 7.

Figure 3:
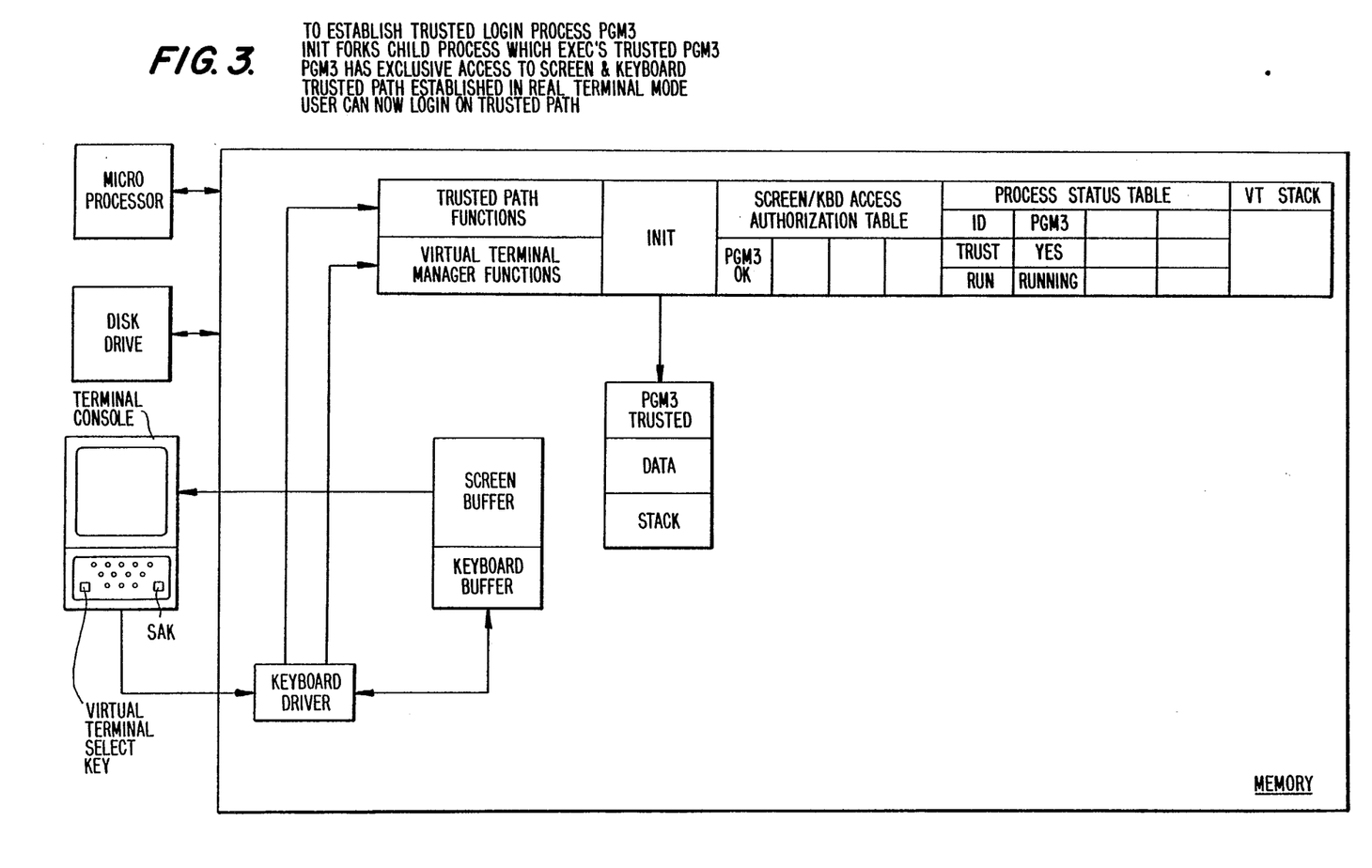
FIG. 3 shows the state following that depicted in FIG. 2, where the trusted login process is established.

In FIG. 3, a trusted shell process PGM3 is established. In accordance with the invention, either the kernel or the init process includes a trusted shell process which can be either a part of the kernel, read in from the disk storage device, or alternately can be a separate trusted file on the disk storage device read in at the command of either the kernel or init. A shell command is a system command interpreter in program language, which can read commands entered at the keyboard and arrange for their execution. The PGM3 trusted process can be a shell process which includes a trusted login process. The init process performs a "fork" system call followed by a "exec" system call to overlay the PGM3 trusted process as the child process of init. Since PGM3 is the child process of init, it is authorized in the screen/keyboard access authorization table to access the screen buffer and the keyboard buffer for the terminal. Since all other processes associated with the terminal process group have been terminated and removed from memory, and since PGM3 is the only resident process now authorized to interact with the screen buffer and keyboard buffer, a trusted path is now established from the terminal to the trusted process PGM3, which can perform a trusted login operation for the user. See the flow diagram of FIG. 7.

Figure 4:
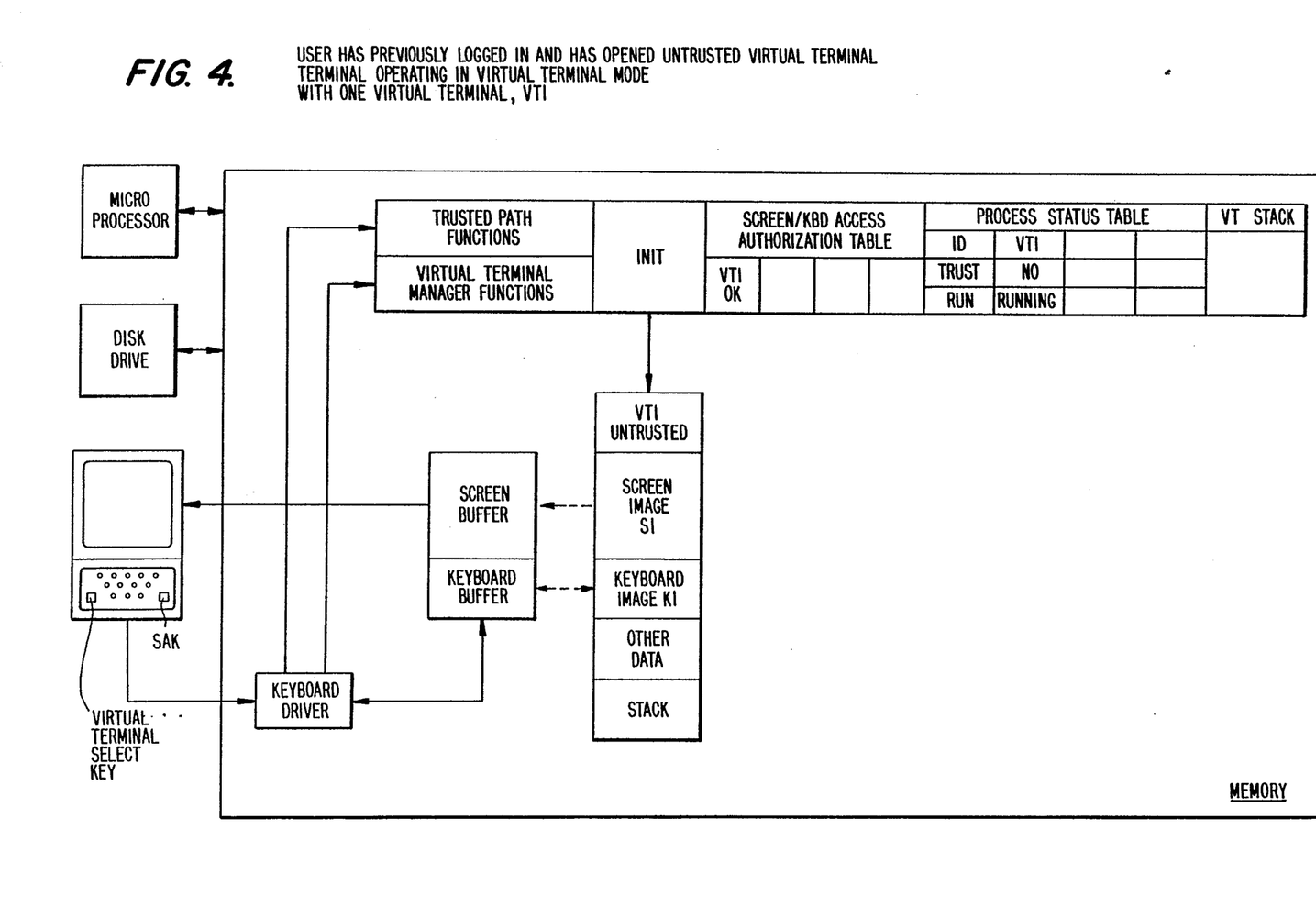
FIG. 4 shows the state of the data processor after the user has logged in and has opened an untrusted virtual terminal.

FIG. 4 depicts the condition of the data processor after the user has logged in and after he has opened an untrusted virtual terminal VT1. A detailed description of the creation and management of virtual terminals in a data processor such as the IBM RT PC, is more fully described in the copending patent application by D.C. Baker, et al referred to above. In virtual terminal operations, on a UNIX-like operating system, several UNIX-type processes can concurrently run in a multi-programming mode, each process being a separate virtual terminal process. As a UNIX-type process, a virtual terminal process such as VT1 shown in FIG. 4, includes a program portion, a data portion, and a stack portion. The data portion of the virtual terminal process can include a screen image S1, which, when written to the screen buffer, will provide the image to be displayed on the terminal associated with the application running in the virtual terminal VT1. The data portion of VT1 can also include a keyboard image K1 which, when written to the keyboard buffer, will provide the customized keyboard definitions for the keys on the keyboard and when read from the keyboard buffer back to the keyboard image K1, will store any character strings which have been output from the keyboard, but which have not yet been operated upon by the VT1 program. Although the screen image S1 and the keyboard image K1 are shown as being a part of the data portion of the VT1 process, it is within the scope of the invention that the screen image and the keyboard image can be stored elsewhere in memory. The data portion of VT1 can also include other data necessary for the particular application run on the VT1 virtual terminal.

Figure 5:
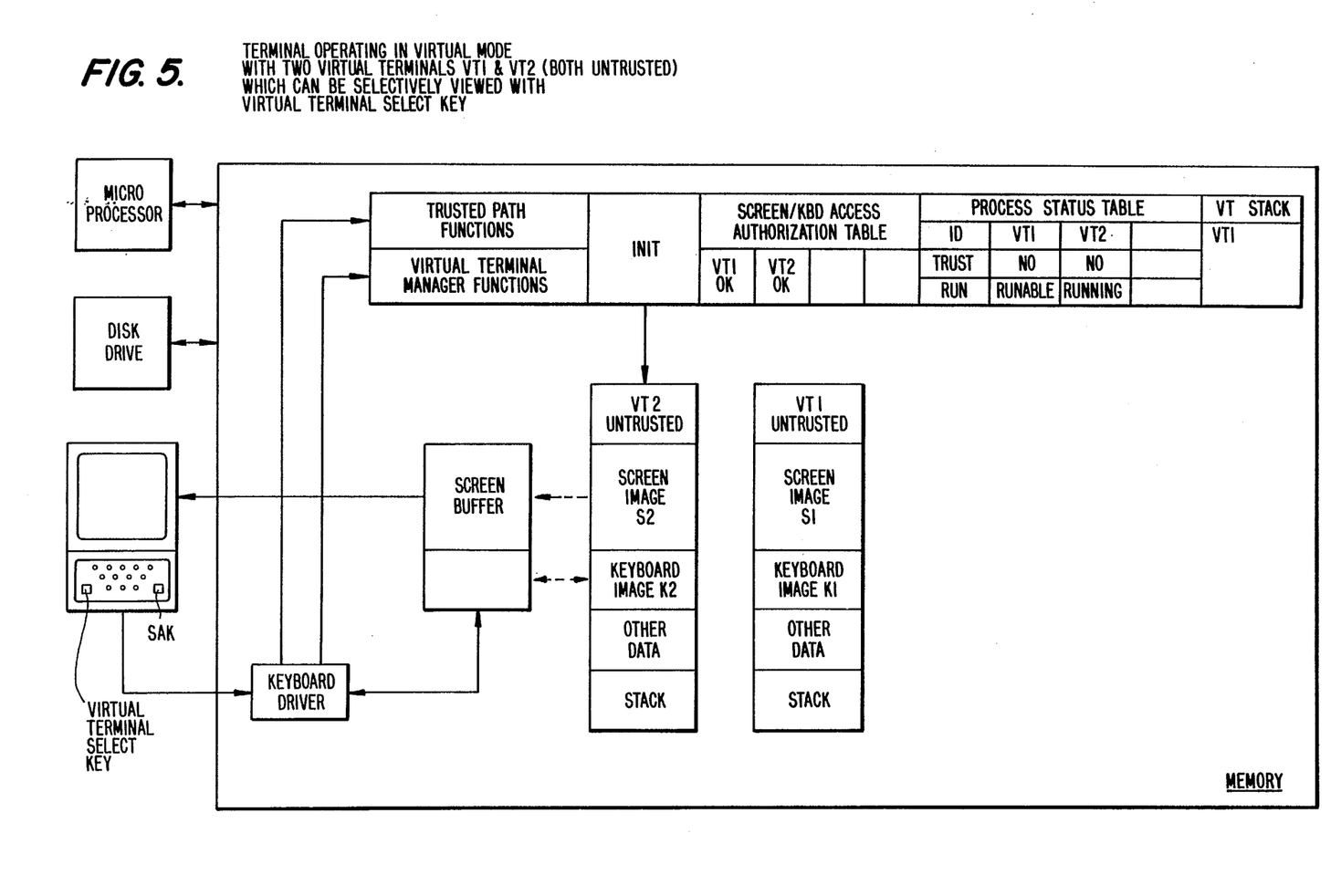
FIG. 5 shows the data processor in a state following that of FIG. 4, where a second untrusted virtual terminal has been opened.

FIG. 5 shows the data processor operating in the virtual mode where a second untrusted virtual terminal VT2 has been opened by the user. Since VT1 and VT2 are UNIX-type processes, they are established by the init process performing its sequential "fork" and "exec" system calls. As each new virtual terminal process is established by init, the last active or running process has its process id placed on top of the virtual terminal stack VT stack, so that if a user terminates an active virtual terminal process, the last preceding active virtual terminal process is identified by popping its id off the VT stack and it can resume its active running state. The user can selectively view and interact with any one of the several virtual terminals which he has opened by pressing the virtual terminal select key on his keyboard. The keyboard driver will pass the virtual terminal select key information to the virtual terminal manager function associated with the init process, and the virtual terminal management operations will be carried out as has been described in the referenced copending patent application by D. C. Baker, et al.

Figure 6:
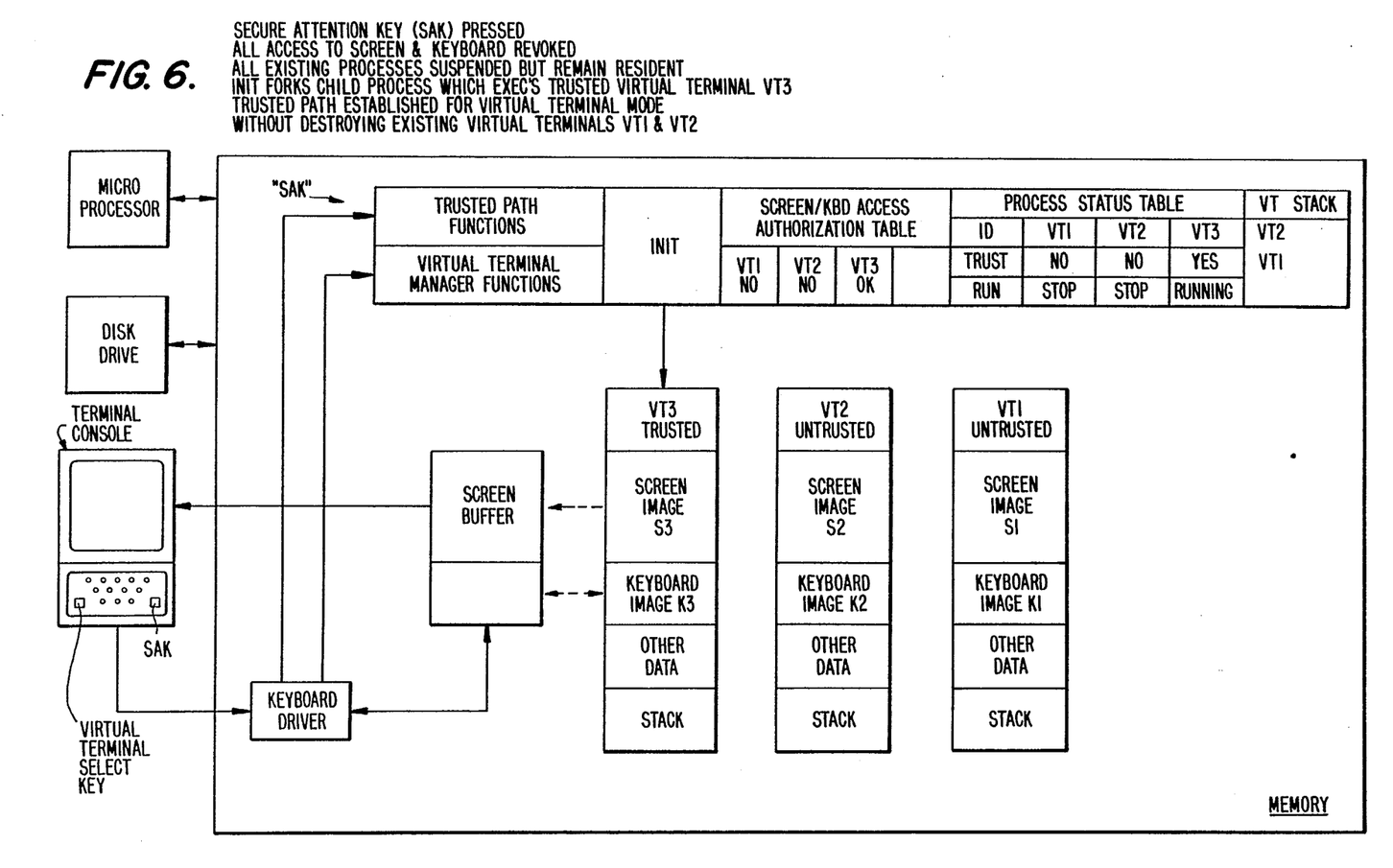
FIG. 6 depicts a state following that of FIG. 5, where the user presses the Secure Attention Key to open a trusted virtual terminal, while the existing untrusted virtual terminals remain resident.

FIG. 6 shows the circumstance where the user has already established two untrusted virtual terminal processes VT1 and VT2 which are resident in memory and the user now wants to carry on trusted computing operations in his data processor. To accomplish this, the user presses the Secure Attention Key (SAK) which is forwarded by the keyboard driver to the trusted path functions of the init process. In response, the init process revokes all access by existing processes to the screen buffer and keyboard buffer, by changing the entries in the screen/keyboard access authorization table. If a particular virtual terminal process VT1, for example, has an application running in it which is performing background operations, such as lengthy statistical computations, that process can optionally be allowed to continue its background execution, but only as long as it does not require access to the screen buffer or the keyboard buffer. As soon as an existing virtual terminal process requires such an access, that access will be denied by the screen/keyboard access authorization table and the running state of the process will be stopped. An entry signifying the state will be made to the process status table. Alternately, all existing virtual terminal processes VT1 and VT2 can be stopped while the trusted path is in operation. The init process now performs a "fork" system call followed by an "exec" system call to overlay the trusted process VT3, which is a virtual terminal process. Either the kernel process or the init process can include the trusted virtual terminal process VT3 as a part of the trusted computing base. Since the trusted virtual process VT3 is a child process of an init, it is authorized to access the screen buffer and the keyboard buffer by means of the entry in the screen/keyboard access authorization table. Since all other processes associated with the terminal console have been stopped but remain resident in memory, and have had their authorizations revoked for access to the screen buffer and the keyboard buffer, there is a trusted path now established from the terminal console to the trusted virtual terminal VT3. The trusted virtual terminal VT3 can have a variety of commands, functions, and subsidiary programs contained within any shell process application running on VT3. An example of this would be a secure login function whereby the user, at the terminal console, can login his id and input his password without fear that an unauthorized user or program will be eavesdropping on his password or other secure data.

After the user has completed his operations over the trusted path to the trusted virtual terminal VT3, the VT3 process can be terminated. Since the VT stack now has as the last active process, the VT2 virtual terminal process, VT2 now becomes the active running process for the system.

Figure 7:
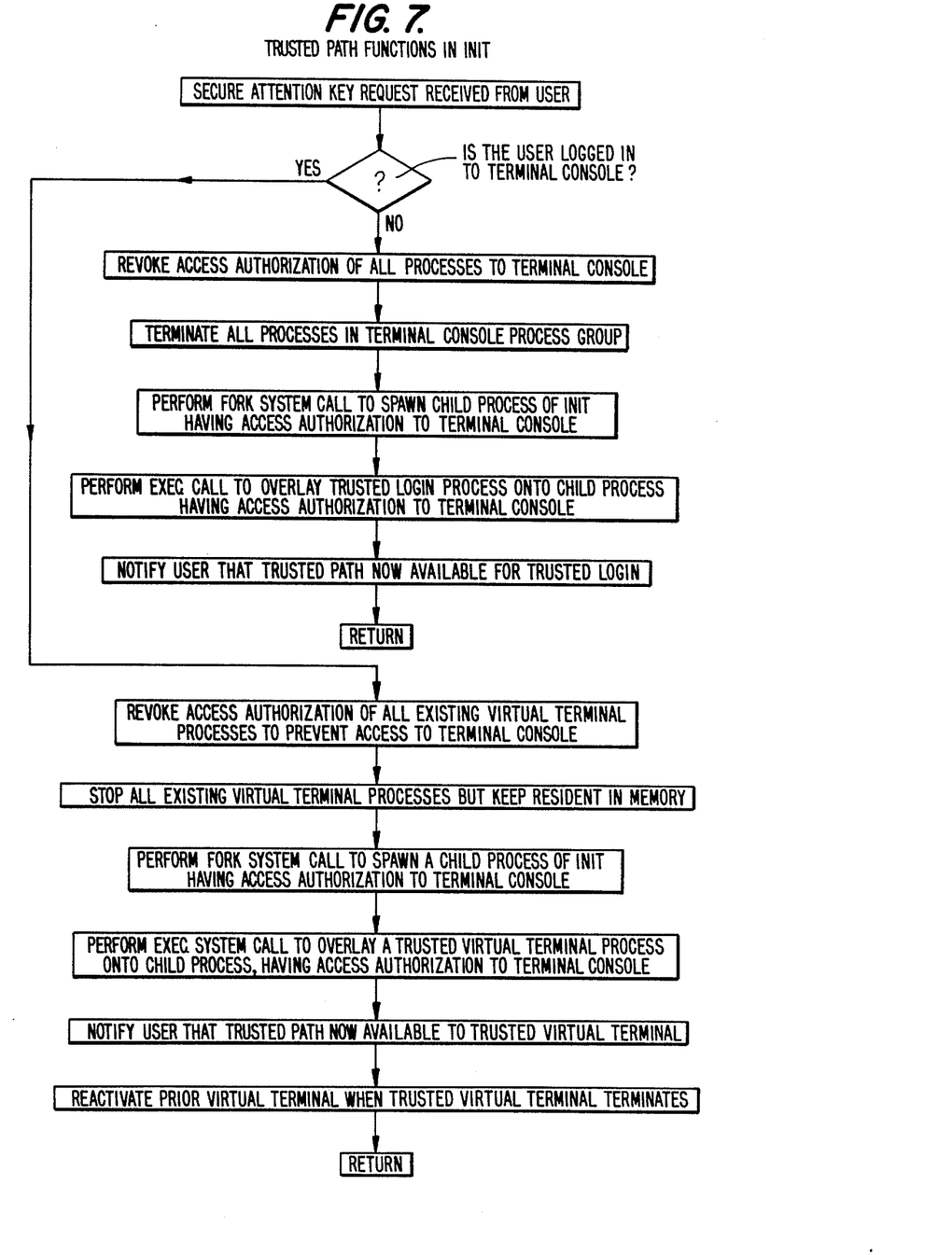
FIG. 7 is a flow diagram of the trusted path functions in init.

The trusted path functions described above, which are a part of the init process, are shown in the flow diagram of FIG. 7.

Implementation of the Invention in the AIX Operating System

The above discussion is necessarily of a generalized nature as far as implementation is concerned, in order to convey the basic principles of operation of the invention herein. The invention finds particular application in the IBM RT PC data processor running the AIX operating system which supports virtual terminal operations. In such an implementation, the keyboard driver referred to above has its functions variously performed by the Virtual Resource Manager (VRM), the High Function Terminal (hft) and the line discipline driver in the IBM RT PC data processor and AIX operating system. The function of the process status table referred to above is performed by a file named "/etc/utemp" in the AIX operating system. The reader is referred to the above referenced IBM publications on the AIX operating system for additional details.

The terminal console of the IBM RT PC running the AIX operating system (AIX/RT) is a High Function Terminal (hft) and supports multiple (up to a maximum of 16) virtual terminals. The console is treated as the main terminal; it has an inode (/dev/console) and its own /etc/utmpentry. All other virtual terminals, although independent, are opened using the same single multiplexed inode (/dev/hft). After a virtual terminal is opened, an independent inode is created in memory for that virtual terminal. Once a user logs in to the console, he can open up to 16 virtual terminals. The hft device also supports a key-translation mechanism, which allows users to map a given keyboard-key to another key sequence. The trusted path mechanism for the hft device allows the user to press the SAK any time as follows:

(i) Before the user logs in to the console to be sure that the user is communicating with the real login program and not a login-masquerading program.
(ii) After the user logs in to the console (and may have opened zero or more virtual terminals) to enter the user's critical data, such as password, and be sure that it is not being stolen by an intruder's program.
(iii) After the user logs out from the console to make sure that the user has actually logged out from the system.

The design of the trusted path mechanism for virtual terminal applies to any UNIX (UNIX is a trademark of AT&T Bell Laboratories) or UNIX-like operating system. However, we will discuss the designs with reference to the implementation on the AIX operating system with the hft support for the console. The following features are made in the AIX operating system to implement the trusted path mechanism with virtual terminals support:

(i) When the line discipline driver receives the SAK from the hft driver, it sends the SIGSAK signal directly to the init process (which has process ID 1).
(ii) The UNIX program init includes functions (a) to receive the SIGSAK signal directly from the line discipline driver, (b) to create a new virtual terminal with a trusted path, (c) to protect a user's console or virtual terminal from unauthorized access during the trusted path, (d) to run a trusted process for the user's console or virtual terminal after creating a trusted path, (e) to update the user's console entry in the /etc/utmp file indicating the existence of a trusted path for the user's hft terminal, (f) to save the process ID (pid) of the trusted shell, and (g) to detect the termination of a trusted path.
(iii) The Virtual Resource Manager VRM can detect the SAK at a lower level without key-translation and pass the SAK to the corresponding hft device driver. Also, the VRM can detect the SAK even in the monitor mode and pass the SAK key sequence to the hft driver. The monitor mode in AIX/RT provides an efficient mode for programs to interact with a virtual terminal directly via a memory mapped I/O bus, thus avoiding read/write system calls.

A user can create a trusted path any time by pressing the SAK at the console or at one of the opened virtual terminals of the hft. The SAK operates in both raw and formatted I/O modes of the terminal. The user can press the SAK before login to the console to make sure that the user is communicating with the real login program and not a login-spoofing program. Or, the user can press the SAK after login to the console to perform secure operations, such as, changing a password. Or, the user can press the SAK after he logs out from the console to make sure that he has actually logged out from the system.

The following provides a layered design of the trusted path mechanism with virtual terminals support:

Detection of SAK and SIGSAK:

When a user presses the SAK at the hft terminal, the line discipline driver detects that the SAK is from the hft, and it sends the SIGSAK signal directly to init.

Creation of a trusted path:

Upon receiving the SIGSAK signal, init creates a trusted path and runs a trusted process on a terminal depending on the state of the running process on the console before the SAK was pressed. The following is a discussion of the operations performed by init for creating a trusted path and executing a trusted process.

If a user presses the SAK before login to the console, init receives the SIGSAK directly from the line discipline driver. Init determines the type of the running process on the console by reading the ut_type field for the console entry in the /etc/utmp file. If the user is not logged in to the console, he will begin operating the terminal in the real mode without any virtual terminals present and the ut_type is either INIT_PROCESS, if the getty processor was running, or LOGIN_PROCESS, if the login processor was running. Init terminates the getty or login process and then creates (forks) a new child process. In the child process, it changes the access mode of the console to -rw-------(readable and writable by the owner only), changes the owner ID and group ID to root(uid=0; gid=0), opens the console and revokes the read/write access for the console to all the processes using the vhangup system call. This would clean the console from any previous access by programs. This creates a trusted path for the user's console and protects the console from reading and writing by unauthorized programs.

Because of the access mode and ownership, only a privileged user can now open the console. Init being a privileged program now reopens the console and executes (execs) the getty process (a trusted process), which prompts the user for a new login.

After login to the console:

If a user presses the SAK after he has already logged in to the console, the top-level process for the console is a user process (usually the user's login shell). The ut_ type filed for the console is either USER_PROCESS or TSH_PROCESS in the etc/utmp file. When a user presses the SAK at the console or at any of the opened virtual terminals, the line discipline driver sends the SIGSAK signal to init. When init receives the SIGSAK signal, it checks if the user is logged in to the console by reading the ut_type field for the console entry in the /etc/utmp file. If the user is logged in then the ut_type is either USER_PROCESS, if the trusted path was not created, or TSH_PROCESS, if the trusted path was already created. If the trusted path was already created, init prints a message on the console indicating that the trusted path was previously created and the trusted shell is already running.

If the trusted path was not created, init forks a new child process and saves the pid of this process; no existing users programs are terminated. In the child process, it opens a new virtual terminal (if one is available) with access mode of the virtual terminal to be -rw------ -(readable and writable by the owner only), makes the virtual terminal as the current user's terminal, and changes the ut_type field for the console entry to TSH_PROCESS in the /etc/utmp file, sets the termio parameters of the virtual terminal to the termio values defined for the console entry in the /etc/utmp file, and then execs the trusted shell. Note, the owner (and group) of the new virtual terminal is root (uid=0; gid=0), since the virtual terminal was created by init, which runs as a root process. If no virtual terminal is available, the child process prints a message on the console indicating that the user should close at least one existing virtual terminal to create the trusted path and run the trusted shell, and then the child process exits. When the child process terminates, init changes the saved pid to −1.

If the user presses the SAK after the creation of the trusted path and execution of the trusted shell, the line discipline driver again sends the SIGSAK signal to init. Init verifies by the positive value of the saved trusted shell pid that the trusted shell is already running with a trusted path created. In this case, init prints a message on the console indicating that the trusted shell is already running and takes no further action.

When the user exits the trusted shell, init detects that it was a trusted shell by comparing the pid of the terminating process with the pid it saved earlier for the trusted shell. Init then changes the value of the saved pid to −1. When the trusted shell exits, the virtual terminal is closed, which brings the user back to the previous virtual terminal.

After log out from the console:

If the user presses the SAK after closing all the virtual terminals and logging out from the console, it will have the same effect as before login as previously described.

Although a specific embodiment of the invention has been disclosed, it will be understood by those having skill in the art that changes can be made to the details of the specific embodiment without parting form the spirit and the scope of the invention.

What is claimed is:

1. In a data processor, including a terminal coupled to a system memory, running an operating system which includes a virtual terminal manager means controlling a plurality of existing virtual terminals in said memory, an apparatus for establishing a protected path for a special user between said terminal and a trusted virtual terminal in said memory comprising:

a secure attention request means in said terminal for outputting a secure attention request from a user;

a trusted path control means coupled to said secure attention request means, for receiving said secure attention request;

a terminal access authorization means coupled to said trusted path control means, for storing the authorization for each of said existing virtual terminals to communicate with said terminal, said trusted path control means, in response to said secure attention request, outputting a revocation message to said access authorization means revoking the authorization of each of said existing virtual terminals to communicate with said terminal;

said trusted path control means establishing a trusted virtual terminal in said memory which is part of a trusted computing base, and outputting an authorization message to said access authorization means authorizing said trusted virtual terminal to communicate with said terminal;

said trusted path control means coupled to said virtual terminal manager means for outputting an activation message thereto to activate said trusted virtual terminal for communicating with said terminal; and whereby a trusted path is established between said terminal and said trusted virtual terminal.

2. The apparatus of claim 1, wherein said operating system is a UNIX-like operating system and said trusted path control means is a part of an init parent process which is a part of said trusted computing base, said trusted virtual terminal being a child process of said init process.

3. The apparatus of claim 2, wherein said trusted virtual terminal has associated therewith a screen image portion and keyboard image portion which are respectively written to a screen buffer and a keyboard buffer of said terminal when said trusted virtual terminal is activated in response to said secure attention request.

4. The apparatus of claim 3, wherein each of said plurality of existing virtual terminals is a child process of said init process.

5. The apparatus of claim 4, wherein each of said plurality of existing virtual terminals has associated therewith a screen image portion and a keyboard image portion which are respectively written to said screen buffer and said keyboard buffer of said terminal when each respective one of said plurality of existing virtual terminals is activated.

6. The apparatus of claim 5 which further comprises:

a virtual terminal stack means coupled to said virtual terminal manager means for storing in a last in-first out order, the identity of each of said plurality of existing virtual terminals when it is deactivated in response to said revocation message from said trusted path control means; and said virtual terminal manager means reactivating a last deactivated one of said plurality of existing virtual terminals indicated by said virtual terminal start means when said trusted virtual terminal terminates its active status.

7. The apparatus of claim 1, wherein said secure attention request means includes a Secure Attention Key in said terminal.

8. In a data processor, including a terminal coupled to a system memory, running an operating system which includes a virtual terminal manager means for controlling a plurality of virtual terminals in said memory, a method for establishing a protected path for a special user from said terminal to a trusted process in said memory, comprising the steps of:

receiving a secure attention request from a user;

terminating in response to said request, all existing processes associated with said terminal and revoking their access thereto when said user is not logged onto said terminal, and then establishing a trusted login process to determine whether said user is a special user; and deactivating in response to said request, all existing virtual terminal processes associated with said terminal and revoking their access thereto when said user is logged onto said terminal as a special user, and then establishing a protected path for said user from said terminal to a trusted process in said memory.

9. In a data processor, including a terminal coupled to a system memory, running an operating system which includes a virtual terminal manager means controlling a plurality of existing virtual terminals in said memory, a method for establishing a protected path for a special user between said terminal and a trusted virtual terminal in said memory, comprising:

inputting a secure attention request from a user at said terminal;

revoking the access authorization of each of said existing virtual terminals to communicate with said terminal, in response to said secure attention request;

establishing a trusted virtual terminal in said memory which is a part of a trusted computing base in response to said secure attention request;

authorizing said trusted virtual terminal to communicate with said terminal; and activating said trusted virtual terminal to communicate with said terminal over a trusted path established therebetween.

10. The method of claim 9 wherein said operating system is a UNIX-like operating system and said trusted virtual terminal is a child process of an init process which is a part of said trusted computing base.

11. The method of claim 10 which further comprises writing a screen image and a keyboard image associated with said trusted virtual terminal, respectively to a screen buffer and a keyboard buffer of said terminal when said trusted virtual terminal is activated in response to said secure attention request.

12. The method of claim 11 wherein each of said plurality of existing virtual terminals is a child process of said init process.

13. The method of claim 12 wherein each of said plurality of existing virtual terminals has a screen image portion and a keyboard image portion associated therewith which are respectively written to said screen buffer and said keyboard buffer of said terminal when each respective one of said plurality of existing virtual terminals is activated.

14. The method of claim 13 which further comprises the steps of:

storing in last-in, first-out order the identity of each of said plurality of existing virtual terminals when it is deactivated in response to such revocation message; and reactivating a last deactivated one of said plurality of existing virtual terminals when said trusted virtual terminal terminates its active status.

* * * * *